United States Patent
Garrity (10) Patent No.: US 10,848,001 B2
(45) Date of Patent: Nov. 24, 2020

(54) THIN FILM PHOTOVOLTAIC WIRELESS INTERFACE

(71) Applicant: Garrity Power Services LLC, Rockwall, TX (US)

(72) Inventor: Paul Garrity, Rockwall, TX (US)

(73) Assignee: Garrity Power Services LLC, Rockwall, TX (US)

( * ) Notice: Subject to any disclaimer, the term of this patent is extended or adjusted under 35 U.S.C. 154(b) by 187 days.

(21) Appl. No.: 16/047,125

(22) Filed: Jul. 27, 2018

(65) Prior Publication Data
US 2019/0036380 A1    Jan. 31, 2019

Related U.S. Application Data

(60) Provisional application No. 62/537,586, filed on Jul. 27, 2017.

(51) Int. Cl.
| | |
|---|---|
| *H01F 27/28* | (2006.01) |
| *H02J 50/12* | (2016.01) |
| *H02S 40/30* | (2014.01) |
| *H02J 7/02* | (2016.01) |
| *H01F 38/14* | (2006.01) |
| *H02J 7/35* | (2006.01) |
| *H02J 50/20* | (2016.01) |
| *H01F 27/40* | (2006.01) |
| *H02J 50/10* | (2016.01) |

(52) U.S. Cl.
CPC .......... *H02J 50/12* (2016.02); *H01F 27/2804* (2013.01); *H01F 27/40* (2013.01); *H01F 38/14* (2013.01); *H02J 7/025* (2013.01); *H02J 7/35* (2013.01); *H02J 50/20* (2016.02); *H02S 40/30* (2014.12); *H01F 2027/2809* (2013.01); *H01F 2027/408* (2013.01); *H02J 50/10* (2016.02)

(58) Field of Classification Search
CPC .... H02J 50/12; H02J 7/025; H02J 7/35; H02J 50/10; H02S 40/30; H01F 27/2804; H01F 27/40; H01F 38/14; H01F 2027/2809; H01F 2027/408; H01F 27/28
See application file for complete search history.

(56) References Cited

U.S. PATENT DOCUMENTS

| | | | |
|---|---|---|---|
| 2014/0029728 A1* | 1/2014 | Kim | H01J 9/025 378/122 |
| 2015/0221785 A1* | 8/2015 | Cheng | H01L 31/02021 136/244 |
| 2016/0315503 A1* | 10/2016 | Park | H02J 50/70 |
| 2016/0322156 A1* | 11/2016 | Yeh | H02J 5/005 |

\* cited by examiner

Primary Examiner — Robert L Deberadinis
(74) Attorney, Agent, or Firm — Hovey Williams LLP; Scott R. Brown (57) ABSTRACT

A power apparatus comprising a wireless power receiver and a photovoltaic panel including a first p-n junction fabricated via a common process onto a substrate comprising low conductivity.

16 Claims, 13 Drawing Sheets

THIN FILM PHOTOVOLTAIC WIRELESS INTERFACE

RELATED APPLICATIONS

The present application is a non-provisional patent application and claims priority benefit, with regard to all common subject matter, of earlier-filed U.S. Provisional Patent Application Ser. No. 62/537,586, filed Jul. 27, 2017, titled "THIN FILM PHOTOVOLTAIC WIRELESS INTERFACE", incorporated by reference herein in its entirety.

BACKGROUND

Many portable electronic devices make use of rechargeable batteries—typically Lithium-Ion batteries. Remotely recharging these batteries involves one of two methods: wireless connection to a wireless power transmitter or wired connection to a small photovoltaic panel.

Modern wireless power transmission makes use of either magnetic induction or magnetic resonance. Magnetic induction systems operate on a principle similar to a transformer in which two coils (the transmitter and receiver) are coupled together magnetically. The magnetic path benefits from placement of a magnetic material above the receiving coil and another below the transmitting coil (assuming that the receiver sits above the transmitter). Magnetic induction systems typically operate at frequencies between 100 kHz and 300 kHz according to wireless power standards Qi and PMA. The coils in magnetic induction systems use litz wire and are both bulky and relatively expensive.

Magnetic resonant systems operate by creating two high-frequency resonant tanks formed with a coil and a capacitor and tuning those resonant tanks to the same frequency. One resonant tank coil acts as a transmitter and another acts as the receiver. A typical operating frequency for a magnetic resonant system is 6.78 MHz. Magnetic resonant systems can transmit over larger distances than magnetic induction systems. Magnetic resonant systems are also less sensitive to coil orientations than are magnetic induction systems. The receiving coil in magnetic resonant systems typically comprises a few turns of copper trace (or sometimes a single turn) on a printed circuit board.

Photovoltaic cells are well known as power sources for use in small consumer electronic devices, particularly in calculators. It is possible to configure a photovoltaic panel to provide charging current to a parallel battery over a limited temperature range simply by producing an appropriate number of photovoltaic cells in series and connecting across the battery to be charged.

While both wireless power and photovoltaic methods of remote battery charging are widely used, both methods require the use of components that are fabricated with entirely different technologies. The different technologies used to create wireless receivers and photovoltaic chargers create a cost barrier to joining these technologies into a more robust remote battery charging solution.

SUMMARY OF THE INVENTION

These and other problems are generally solved or circumvented, and technical advantages are generally achieved, by advantageous embodiments of the present invention, including a power apparatus comprising a wireless power receiver and a photovoltaic panel having a first p-n junction fabricated via a common process onto a non-conducting or minimally conductive (such as ferrite) substrate. As used herein, "process" includes inkjet printing, offset printing, screen printing, photolithography, sputtering, and the like. As used herein, "common" denotes a single instance or iteration. In one embodiment, the wireless power receiver comprises an antenna, a capacitor, and a rectifier diode including a second p-n junction. In another embodiment, the first p-n junction and the second p-n junction each comprise a layer of p-doped material deposited via a common process. In still another embodiment, the common process is used to print p-doped material, n-doped material, conductive material, and a layer of insulation.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, reference is now made to the following descriptions taken in conjunction with the accompanying drawings, in which.

Corresponding numerals and symbols in the different FIGUREs generally refer to corresponding parts unless otherwise indicated and may not be re-described in the interest of brevity after the first instance. The FIGUREs are drawn to illustrate the relevant aspects of exemplary embodiments.

DETAILED DESCRIPTION OF ILLUSTRATIVE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art in from the description. For example, a feature, structure, act, etc. described in one embodiment may also be included in other embodiments, but is not necessarily included. Thus, the current technology can include a variety of combinations and/or integrations of the embodiments described herein.

Figure 1:
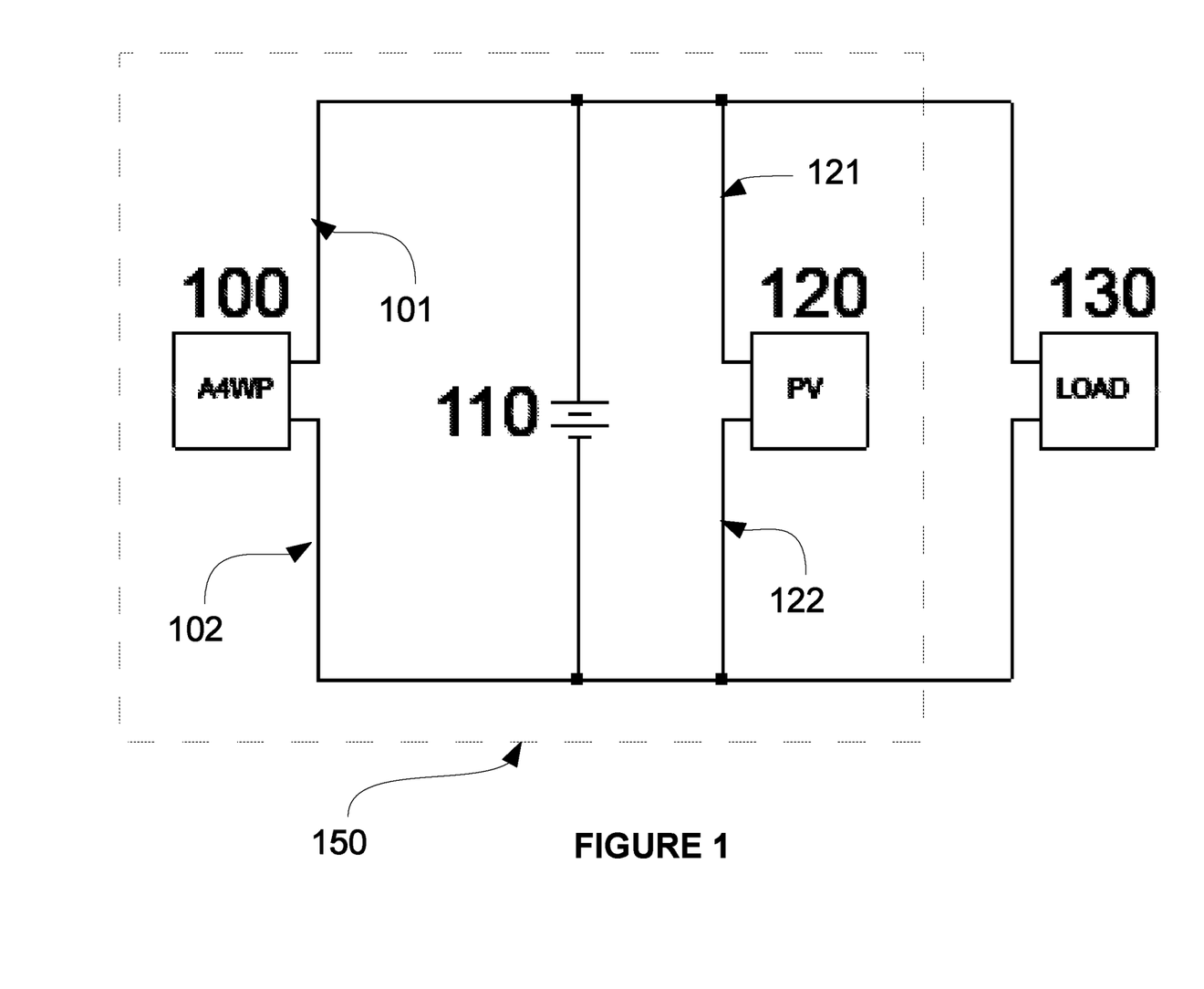
FIG. 1 is a schematic of an embodiment of a photovoltaic wireless interface.

Turning now to FIG. 1, a Photovoltaic Wireless Interface 150 will be described in detail. A4WP receiver 100 is coupled to battery 110 through antenna terminals 101 and 102. Battery 110 is further coupled to thin-film photovoltaic panel 120 through panel terminals 121 and 122. Battery 110 is also coupled to load 130.

Battery 110 provides power to load 130 and can be charged from either thin-film photovoltaic panel 120 or A4WP receiver 100. When light shines on thin-film photovoltaic panel 120, then thin-film photovoltaic panel 120 charges battery 110. When Photovoltaic Wireless Interface 150 is in the vicinity of an A4WP wireless power transmitter, then A4WP receiver 100 wirelessly receives power and charges battery 110. Thus, Photovoltaic Wireless Interface 150 is capable of keeping battery 110 charged with only the presence of light; however, wireless power receiver 100 provides a backup method of charging in case no light is available.

Figure 2:
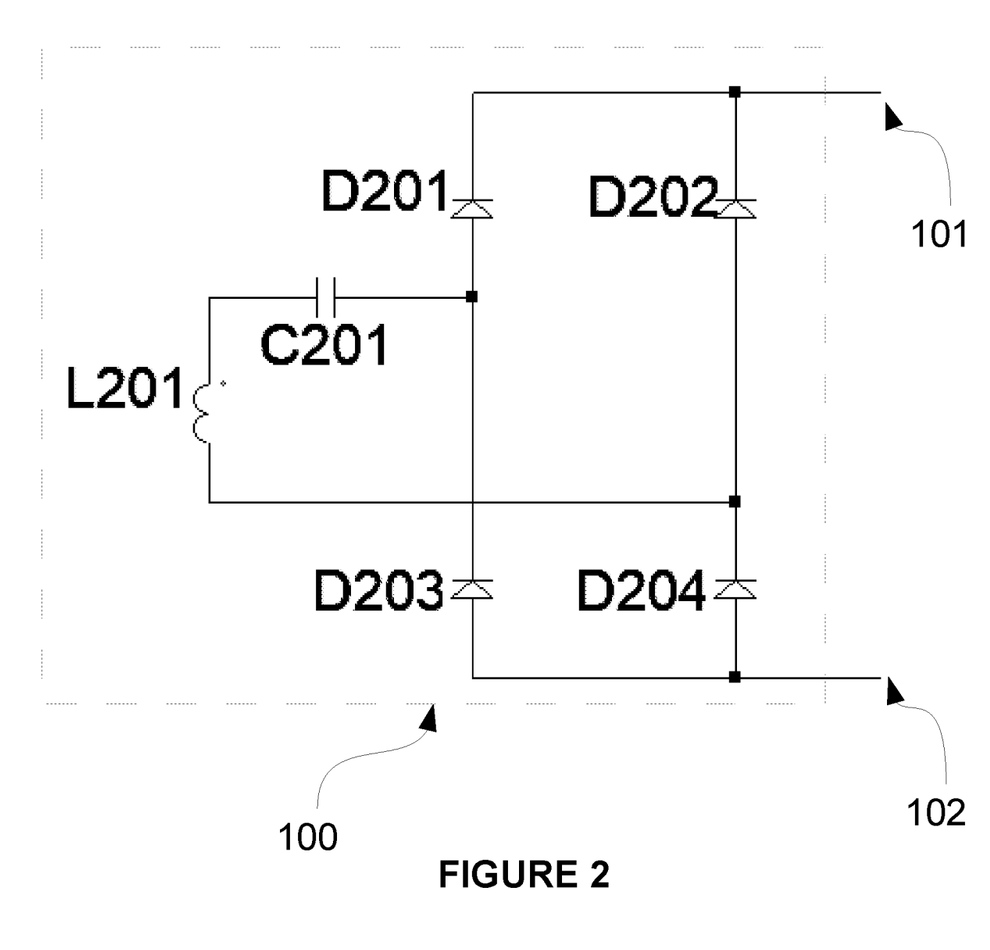
FIG. 2 is a schematic of a wireless receiver constructed in accordance with an embodiment of the invention.

Turning to FIG. 2, wireless receiver 100 will now be described in more detail. Wireless receiver 100 includes antenna L201 and resonant capacitor C201. Antenna L201 typically comprises a printed wiring trace and is coupled to resonant capacitor C201. The inductance of antenna L201 is configured to resonate with the capacitance of capacitor C201 at a frequency equal to that of a wireless power transmitter. Such resonant frequency could for example be 6.78 MHz.

Antenna L201 and resonant capacitor C201 are further coupled to the AC terminals of a full-bridge rectifier comprised of diodes D201, D202, D203, and D204. Output terminal 101 is coupled to the anodes of D201 and D202. Output terminal 102 is coupled to the cathodes of D203 and D204. Output terminal 101 is therefore the positive terminal of the full-bridge rectifier and output terminal 102 is therefore the negative terminal of the full-bridge rectifier comprised of diodes D201, D202, D203, and D204.

When Photovoltaic Wireless Interface 150 is in the vicinity of an A4WP wireless power transmitter, then a sinusoidal voltage is induced in antenna L201, said sinusoidal voltage being equal in frequency to that of the wireless power transmitter. The magnitude of the sinusoidal voltage will be high if the transmission frequency is equal to the resonant frequency $f_{res}$ of L201 and C201, which is:

$$f_{res} = \frac{1}{2\pi\sqrt{L201 \square C201}}$$

The full-bridge rectifier comprised of diodes D201, D202, D203, and D204 rectifies the induced voltage across L201 to provide positive charging current to terminal 101 and negative charging current to terminals 102.

Figure 3:
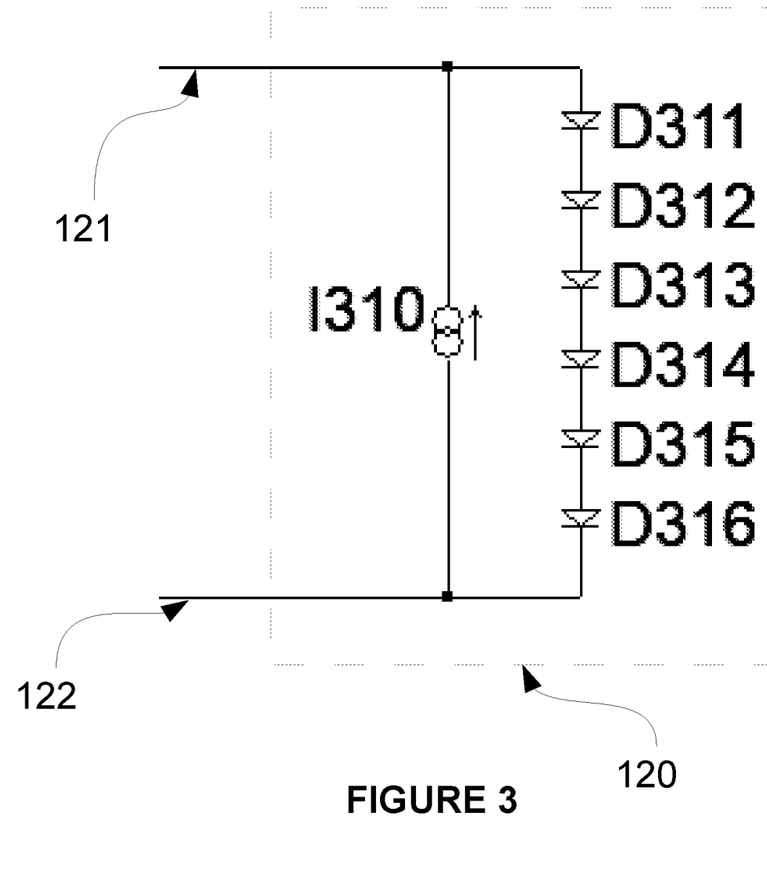
FIG. 3 is a schematic of a photovoltaic module constructed in accordance with an embodiment of the invention.

Turning to FIG. 3, a photovoltaic module will now be described in detail. Diodes D311, D312, D313, D314, D315, and D316 represent the voltage drops across six photosensitive P-N junctions wired in series. Current source 1310 represents the dc current produced by the same six photosensitive P-N junctions that are wired in series. In practice, photovoltaic panel 120 may comprise any number of photosensitive P-N junctions wired in series such as six photosensitive P-N junctions as shown in FIG. 3. The voltage produced across photovoltaic panel 120 is the sum of the voltage across the P-N junctions wired in series. The current 1310 produced by photovoltaic panel 120 will be a function of load (panel voltage divided by load impedance) and will be limited to a value proportional to the level of light striking photo-diodes D311, D312, D313, D314, D315, and D316.

Figure 4:
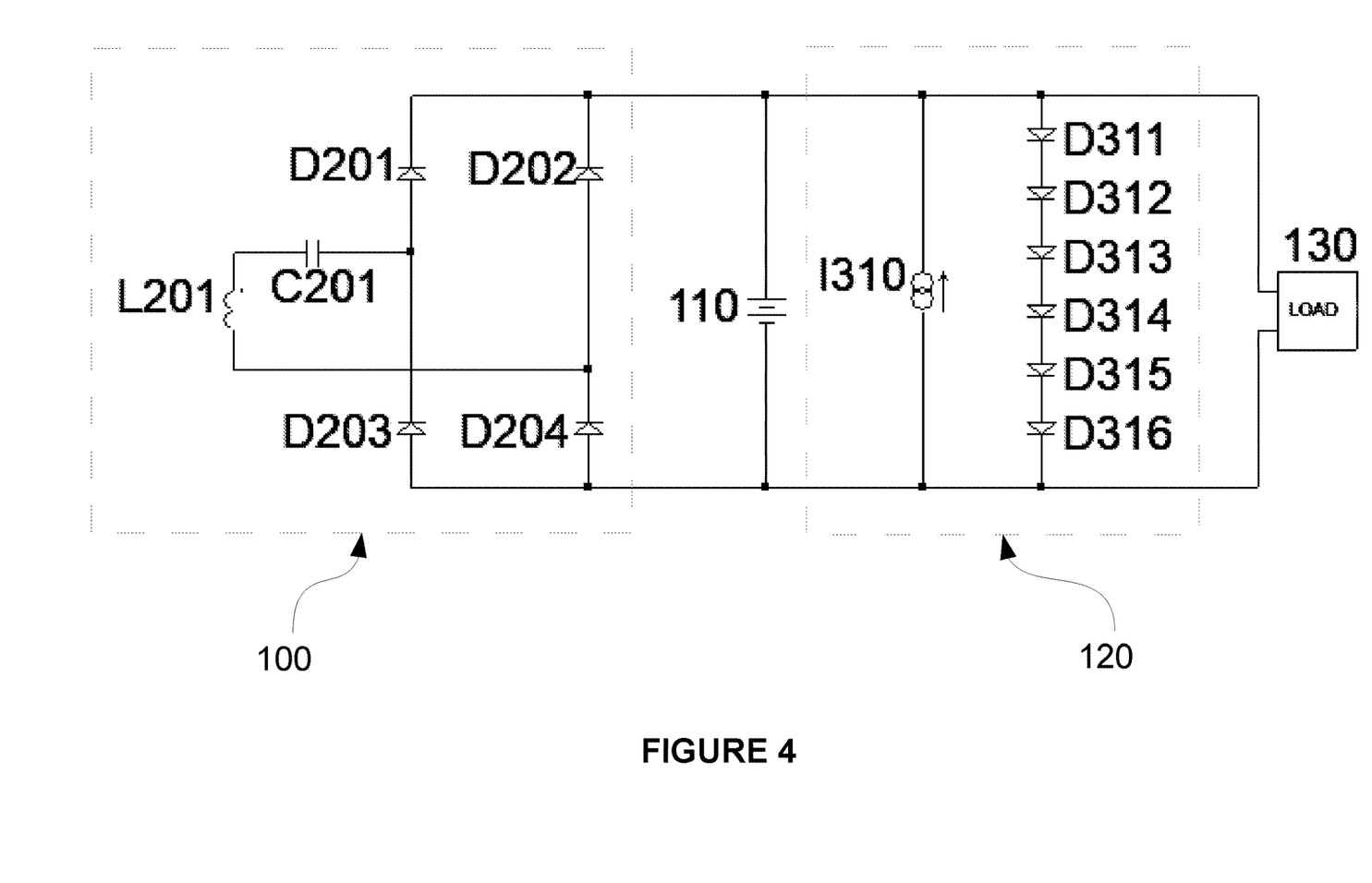
FIG. 4 is a schematic of a photovoltaic wireless interface constructed in accordance with an embodiment of the invention.

Turning to FIG. 4, a photovoltaic wireless interface will now be described in detail. The schematic illustrated in FIG. 4 is the same as that shown in FIG. 1 except that A4WP receiver 100 is replaced with the wireless receiver in FIG. 2 and photovoltaic panel 120 is replaced with the photovoltaic module in FIG. 3. As shown in FIG. 4, load 130 can receive power and battery 110 can be charged when either a voltage is induced across antenna L201 or when light shown on panel 120 induces current flow 1310. Of further note is the fact that the circuit components in A4WP receiver 100 are parallel with the circuit components of PV panel 120. As will be explained subsequently, the components in A4WP receiver 100 and PV panel 120 have the further properties that they can be produced via a common process, thus providing a low-cost dual power source for charging battery 110 and providing power to load 130.

Figure 5:
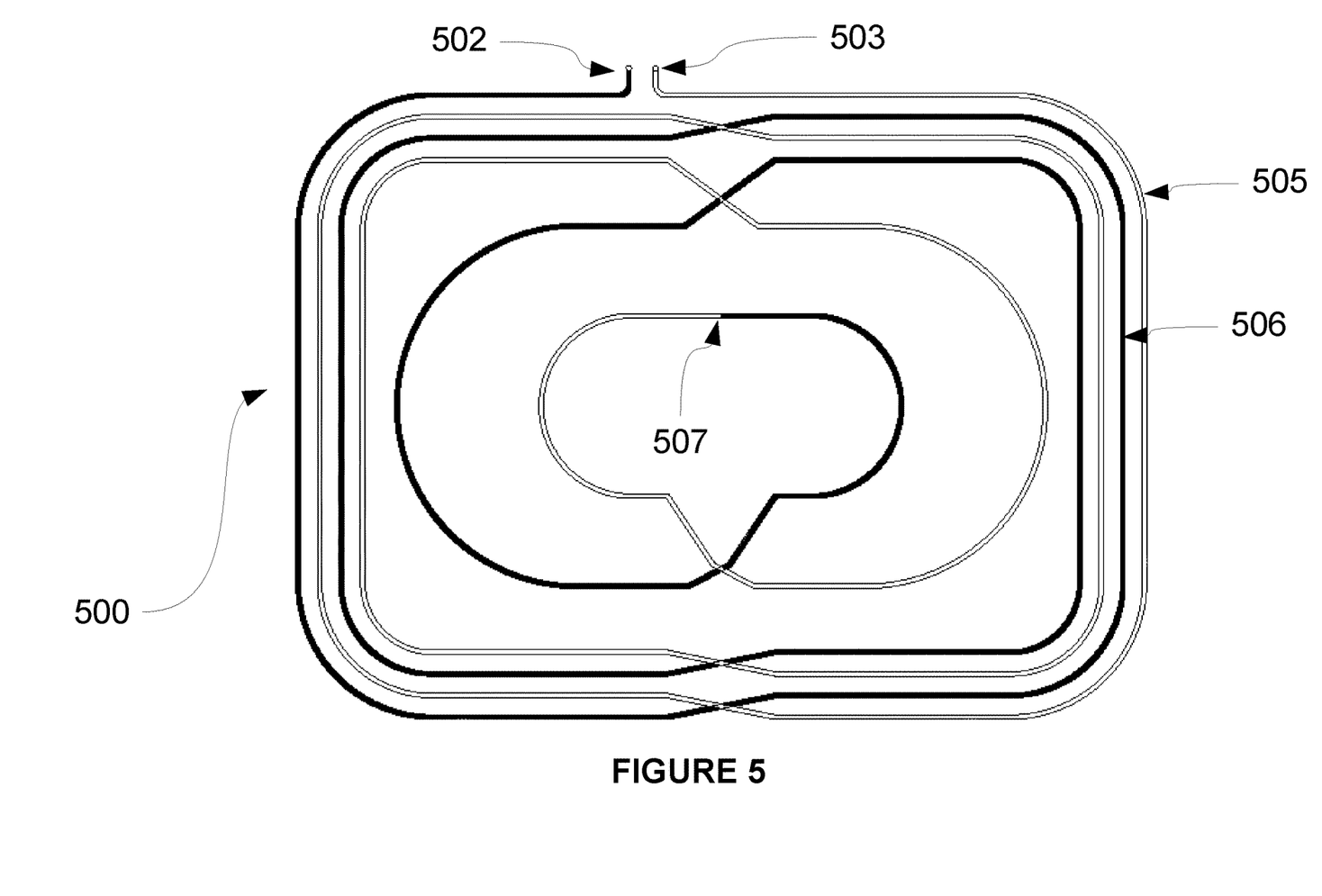
FIG. 5 is a top view of a printed circuit of a wireless antenna constructed in accordance with an embodiment of the invention.

Turning now to FIG. 5, an embodiment of an A4WP antenna 500 will now be described in detail. Antenna 500 could serve the function of antenna L201 in FIGS. 2 and 4. Antenna 500 comprises terminals 502 and 503. Antenna 500 is a planar antenna occupying two planes. Trace 505 of the antenna in the upper plane is shown as white and trace 506 of the antenna in the lower plane is shown as black. Upper trace 505 and lower trace 506 are joined at tie-point 507. Note that upper trace 505 and lower trace 506 have very little overlap between them, helping to reduce any capacitance between the two traces. While the example illustrated in FIG. 5 employs two conductive layers and five turns, other numbers of turns and layers can be used, including a single turn which would require only a single layer.

The shape of the antenna illustrated in FIG. 5 is an example of an embodiment of an A4WP antenna. However, many other antenna shapes can be used. Importantly, the antenna comprises a conductive trace in a limited number of planes. It is also important that any substrate upon which the traces of antenna 500 are deposited has low electrical conductivity because any electrically conducting material located directly beneath the traces of antenna 500 would prevent a transmitted power signal from reaching the antenna.

Figure 6:
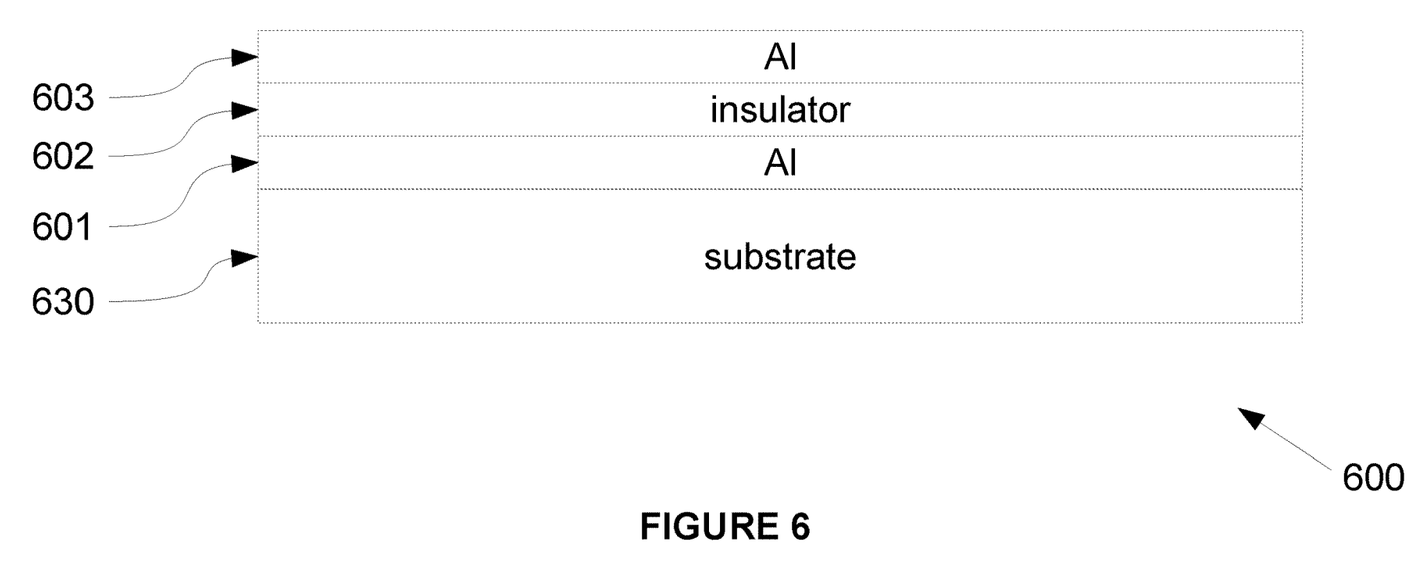
FIG. 6 is an elevation view of a layered construction of an antenna or capacitor constructed in accordance with an embodiment of the invention.

Turning now to FIG. 6, a simplified stack of layers in an embodiment of the antenna shown in FIG. 5 will now be described in detail. Lower conducting layer 601 is deposited onto non-conducting or minimally conducting substrate 630. Substrate 630 could advantageously comprise a flexible non-conducting material such as paper, polyethylene film, or other plastic film, thus allowing substrate 630 to be processed by ink jet printer or other printing technique. Substrate 630 could also comprise a minimally conductive magnetic material such as ferrite. Insulator layer 602 is deposited onto lower conducting layer 601. Insulator layer 602 could for example comprise silicon dioxide or a plastic such as polypropylene or polystyrene. Any electrically insulating material or combination of materials can be used in layer 602. Upper conducting layer 603 is deposited onto insulator layer 602. Tie-point 507 from FIG. 5 may be accomplished by removal of insulator layer 602 at the tie-point or by placing electrically-conducting material on layer 602 at the tie-point.

It should be noted that the thin-film stack of layers shown in FIG. 6 that is used to fabricate an A4WP antenna could equally well be used to fabricate a capacitor by creating a large area in which both conductive layers 601 and 603 are present. In such a case, the capacitance would be defined by the following equation:

$$C = \frac{\varepsilon A}{d}$$

where C is the capacitance, ε is the permittivity of insulator 602, A is the area of insulator 602, and d is the thickness of insulator 602.

Figure 7:
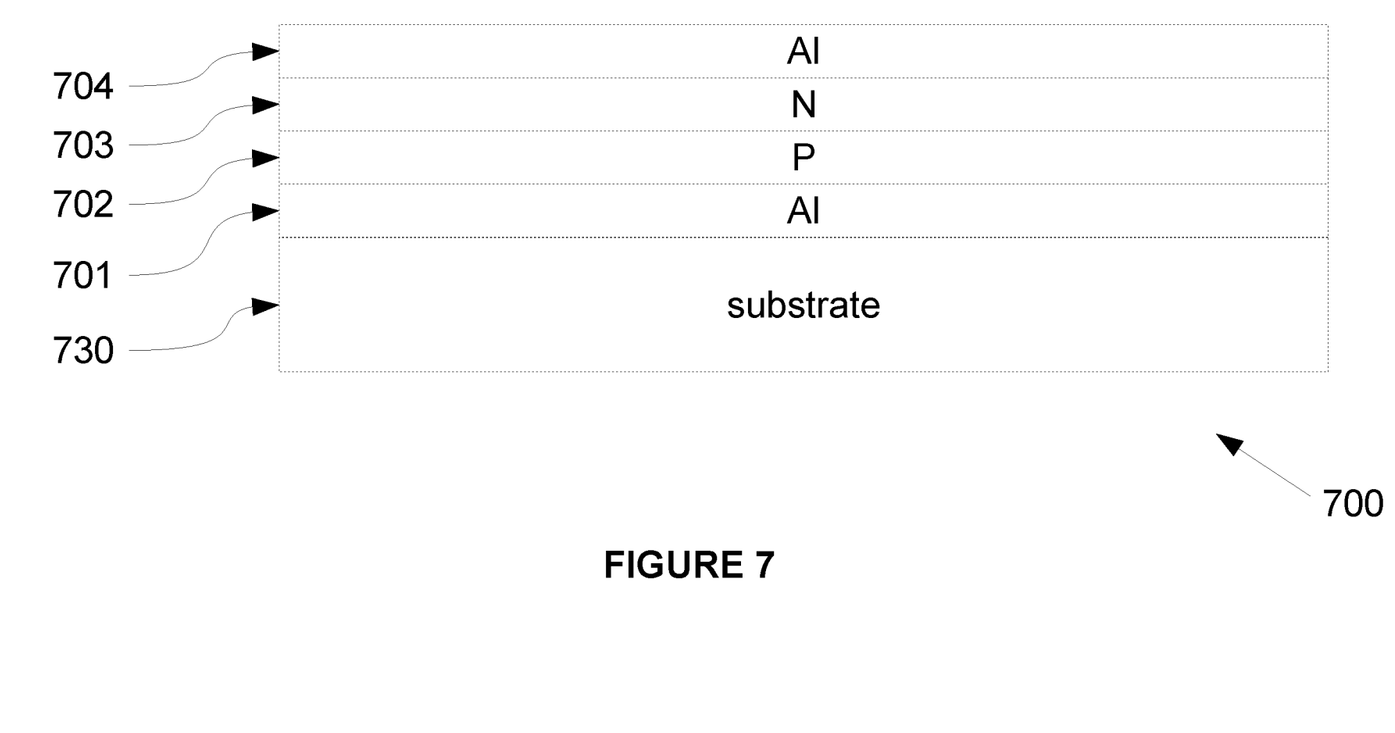
FIG. 7 is an elevation view of a layered construction of a thin-film p-n junction constructed in accordance with an embodiment of the invention.

Turning to FIG. 7, a simplified stack of layers in an embodiment of thin-film photo-diode 700 will now be described in detail. Conducting layer 701 is deposited onto substrate 730. P-doped layer 702 is deposited onto conducting layer 701. N-doped layer 703 is deposited onto P-doped layer 702. Conducting layer 704 is deposited onto N-doped layer 703. Conducting layers 701 and 704 comprise terminals of P-N junction 700.

It should be noted that P-N junction 700 allows reception of light. When exposed to photons, the P-N junction is able to produce a current proportional to the number of photons. It should also be noted that apart from the photo-electric effect just described, P-N junction 700 behaves as a semiconductor diode, allowing current to flow in only a single direction. If P-N junction 700 were covered so as to be opaque to light, it would behave as a standard diode. Therefore a common process can be used to create a thin-film photovoltaic panel and a standard semiconductor diode with the addition of an opaque layer or cover.

FIGS. 6 and 7 thus demonstrate a stack of layers that can be used to create semiconductor diodes, photo-sensitive P-N junctions, A4WP power receiver antennas, and capacitors. That is, all of the circuit elements described in A4WP receiver 100 (of FIGS. 1, 2, and 4) and in thin-film photovoltaic panel 120 (of FIGS. 1, 3, and 4) can be fabricated by proper patterning of conductive materials, insulating material, P-doped material, and N-doped material. As many techniques already exist for producing thin-film photovoltaic panels that require deposition of all of the aforementioned layers, the same techniques used for producing thin-film photovoltaic panels can be used to create A4WP receivers in a common production process. Such production techniques include but are not limited to photolithography, sputtering, offset printing, screen printing, and inkjet printing.

Figure 8:
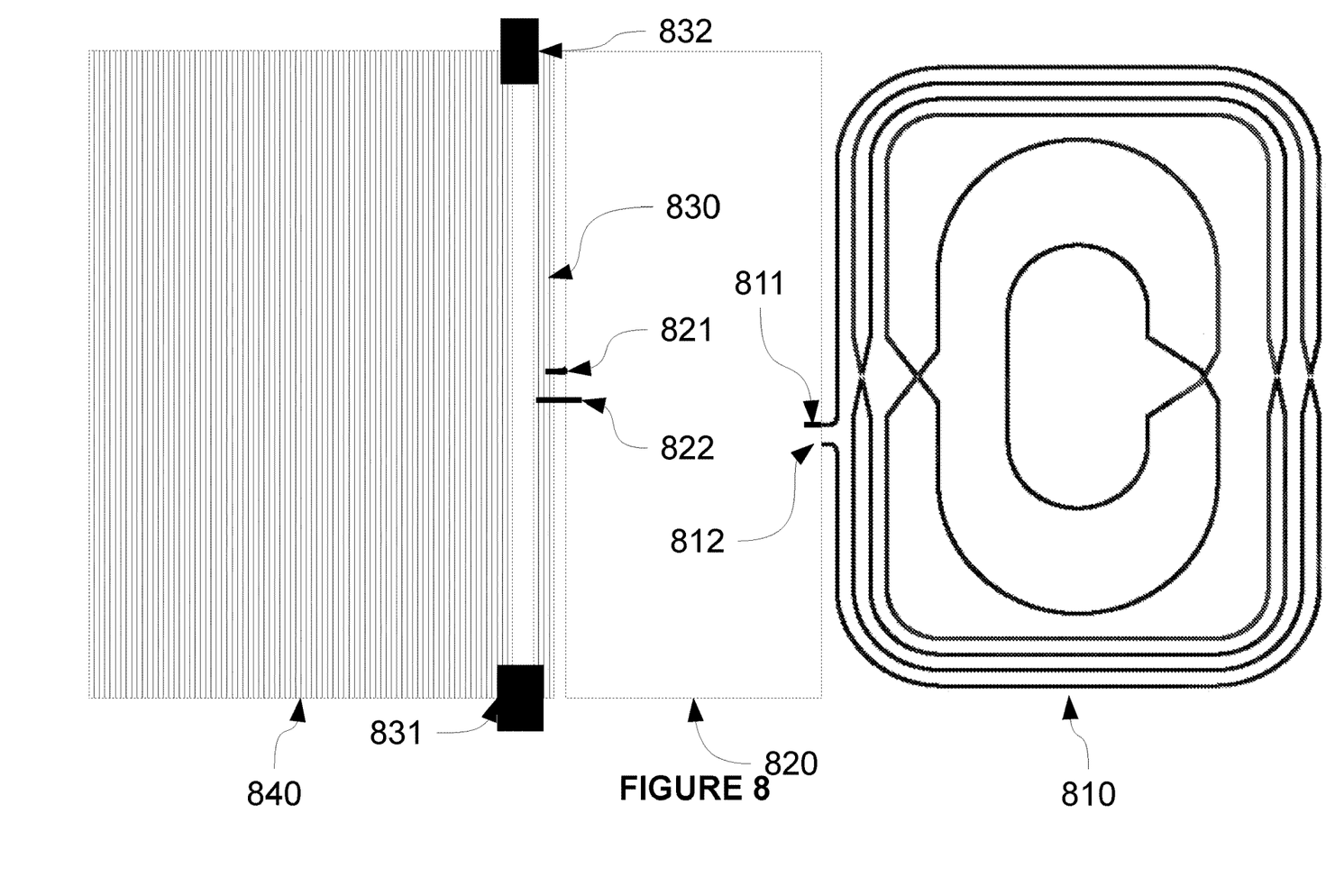
FIG. 8 is a top view of a photovoltaic wireless interface constructed in accordance with an embodiment of the invention.

Turning to FIG. 8, a structure that functions as an A4WP receiver in parallel with a thin-film photovoltaic panel will now be described in detail. Capacitor 820 is a parallel plate capacitor that could use a layer stack as illustrated in FIG. 6 in which the conductive planes and insulator plane are all rectangles. It should be noted that while the capacitor 820 is illustrated as a rectangle, any shape can be used provided the surface area is controlled to provide adequate capacitance. Antenna 810 uses exactly the same layer stack as capacitor 820, except that antenna 810 has thin traces in its conducting layers as illustrated in FIG. 5 and conductive material near the tie point between the two layers (tie point 507 in FIG. 5). Jumper 811 couples one end of antenna 810 to the upper conductive layer of capacitor 820 and jumper 812 couples the other end of antenna 810 to the lower conductive layer of capacitor 820.

A4WP receivers must be tuned to a specific transmission frequency, such as 6.78 MHz, to efficiently receive wirelessly transmitted power. As previously discussed, the resonant frequency of the receiver is a function of antenna inductance and capacitance of the resonant capacitor. Due to variances in fabrication processes, it is expected that the capacitance of capacitor 820 will vary somewhat from one device to the next. System tuning, however, can be accomplished by designing the capacitor plate to be slightly larger than necessary and afterward trimming down the area of the capacitor until obtaining a high amplitude voltage signal across the capacitor when the device is brought into the vicinity of an appropriate wireless power transmitter operating at the target frequency. Trimming of the capacitor size can be accomplished, for example, by laser trimming or physically abrading the capacitor along an edge.

Full-bridge rectifier 830 comprises four P-N junction diodes configured as a full-wave rectifier. The AC terminals of full-bridge rectifier 830 are coupled to the upper and lower conductive layers of capacitor 820 through jumpers 822 and 821, respectively. Photovoltaic panel 840 comprises a series-parallel combination of P-N junctions configured to produce an appropriate charging voltage for an external battery (not shown). Terminals 831 and 832 couple the DC terminals of full-bridge rectifier 830 to photovoltaic panel 840 and also provide contacts to connect to an external load such as a battery or an electronic device.

The structure in FIG. 8 thus represents a multiple power source comprising an A4WP wireless power receiving antenna coupled to a photovoltaic panel, all of which can be produced using a common process.

It should be noted in the illustration of FIG. 8 that capacitor 820 and photovoltaic panel 840 each occupy a significant part of the surface area required to create the multiple power source. Another embodiment reduces the required surface area by stacking the photovoltaic panel 840 on the capacitor 820.

Figure 9:
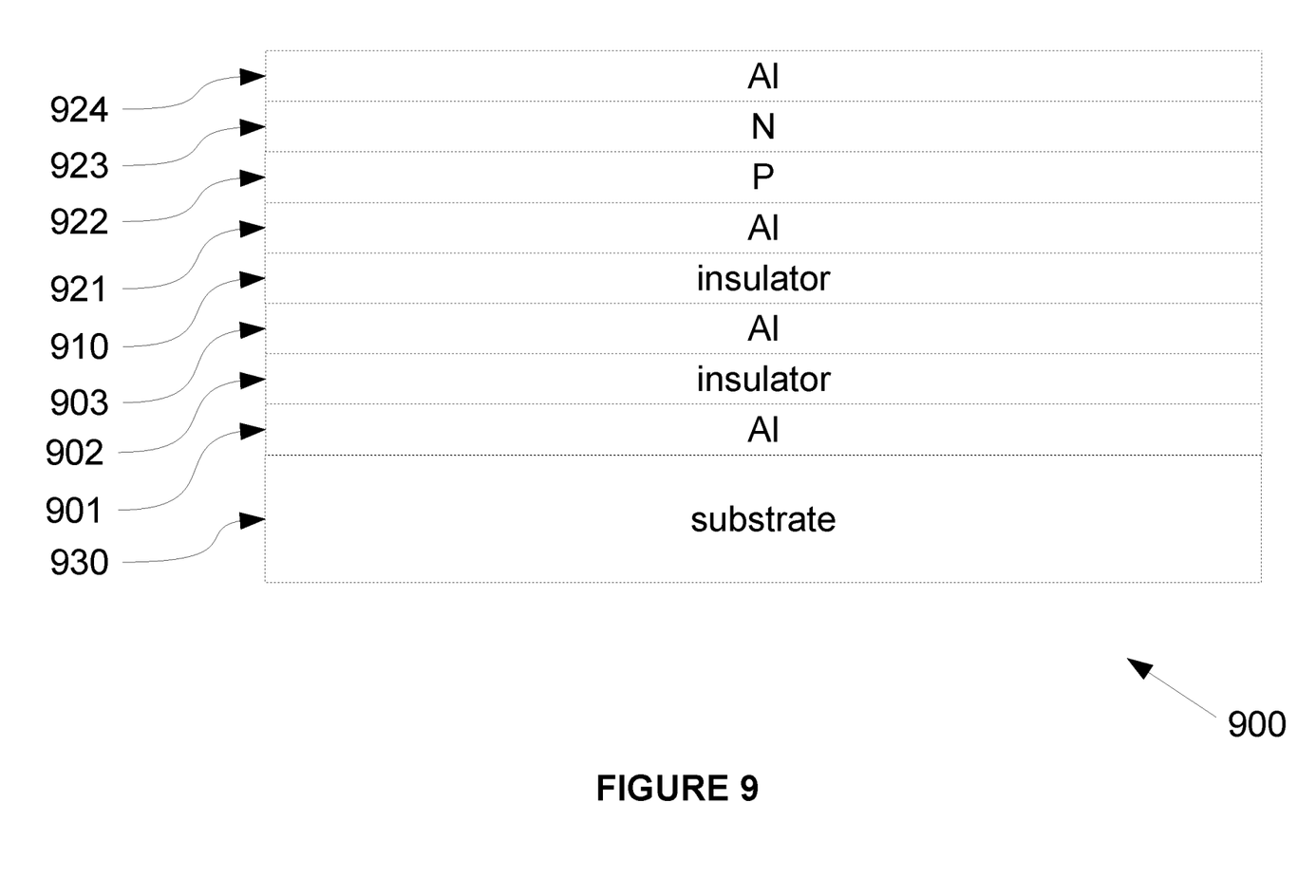
FIG. 9 is an elevation view of a layered construction of a thin-film p-n junction above a capacitor constructed in accordance with an embodiment of the invention.

Turning to FIG. 9, a layer structure that can be used to stack a photovoltaic panel on a capacitor will now be described in detail. Conductive layer 901 is deposited onto substrate 930. Insulator layer 902 is deposited onto conducting layer 901. Insulator layer 902 could for example comprise silicon dioxide or a plastic such as polypropylene or polystyrene. Any electrically insulating material or combination of materials can be used in layer 902. Conducting layer 903 is deposited onto insulator layer 902. Another insulating layer 910 is deposited onto conducting layer 903. Another conducting layer 921 is deposited onto insulating layer 910. P-doped material 922 is deposited onto conducting layer 921. N-doped material 923 is deposited onto P-doped material 922. Another conducting layer 924 is deposited onto N-doped material 923.

A capacitor may be formed using conducting layers 901 and 903 and insulating layer 902. An A4WP antenna can be formed using either the same layers as the capacitor, or the antenna can be formed using conductive layers 903 and 921 and insulating layer 910. Using insulating layer 910 for the antenna may be advantageous by allowing a different dielectric for insulator 902 used in the capacitor and insulator 910 used between traces of the antenna. P-N junctions may be formed using conductive layers 921 and 924 as well as P-doped layer 922 and N-doped layer 923.

Insulating layer 910 may insulate the lower conductor 921 of the P-N junction from the upper plate 903 of the capacitor. Thus the surface area of the P-N junction may partly or completely overlap the surface area of the capacitor. Note that substrate 930 should be composed of a non-conducting or minimally conducting material so that an A4WP antenna trace fabricated within the layers shown in FIG. 9 may receive a wireless power transmitted signal without signal degradation.

Figure 10:
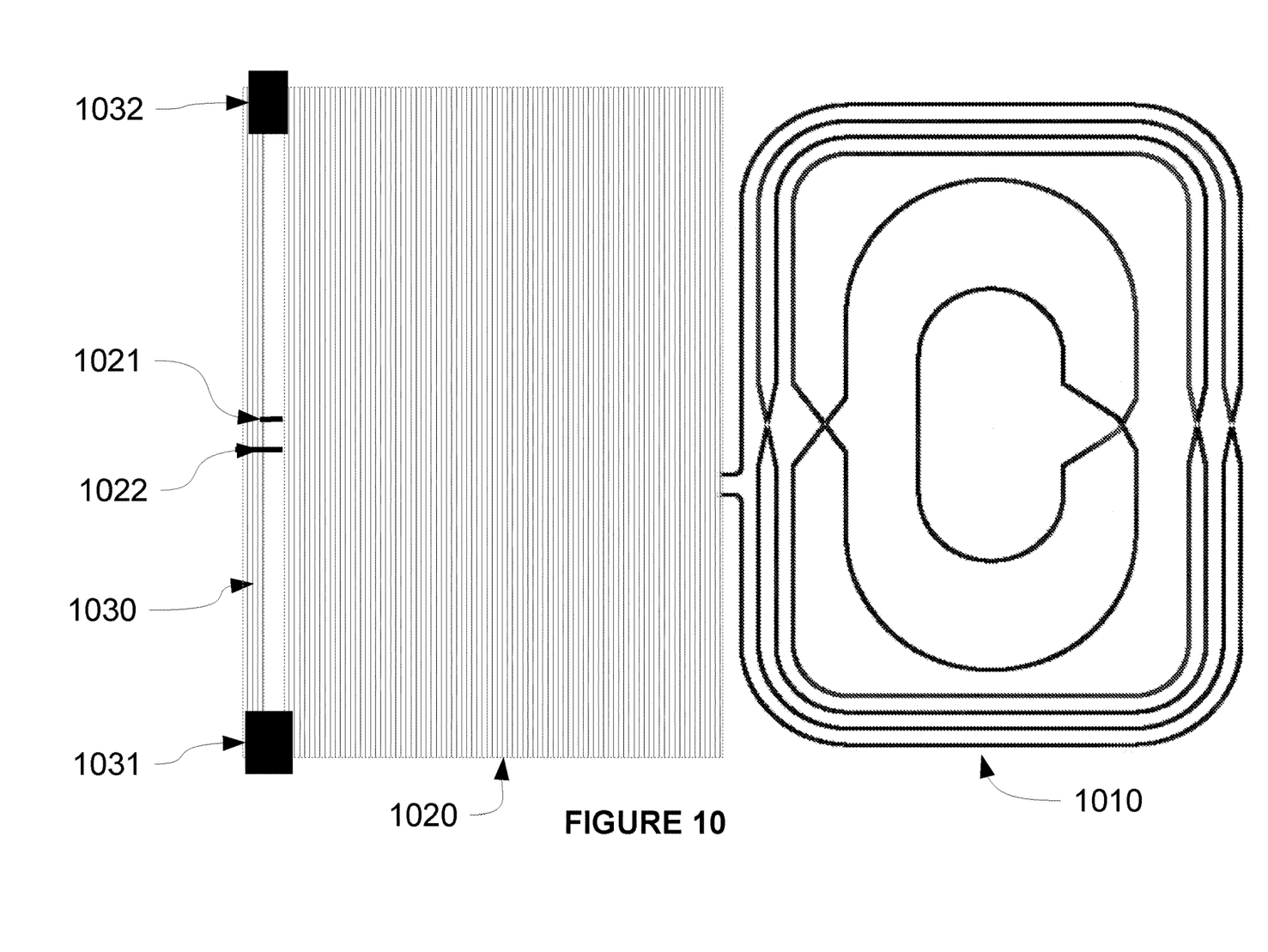
FIG. 10 is a top view of a photovoltaic wireless interface constructed in accordance with an embodiment of the invention.

Turning to FIG. 10, a structure that functions as an A4WP receiver in parallel with a thin-film photovoltaic panel will now be described in detail. Structure 1020 is a parallel plate capacitor underneath a photovoltaic panel that uses a layer stack as illustrated in FIG. 9 such that the capacitor uses layers 901, 902, and 903 and the photovoltaic panel uses layers 921, 922, 923, and 924. Antenna 1010 may use layers 903, 910, and 921. The capacitor at the bottom of structure 1020 is coupled to full-bridge rectifier 1030 through jumpers 1021 and 1022. Full-bridge rectifier 1030 is coupled to the photovoltaic panel at the top of structure 1020 through terminals 1031 and 1032. Terminals 1031 and 1032 also provide contacts to connect to an external load such as a battery or an electronic device.

Ferrite is a magnetic material with low conductivity. Techniques exist that allow deposition of ferrite onto a substrate through various means such as printing. Ferrite can thus be deposited as a layer in a printing process along with other layers here-to-fore discussed.

Figure 11:
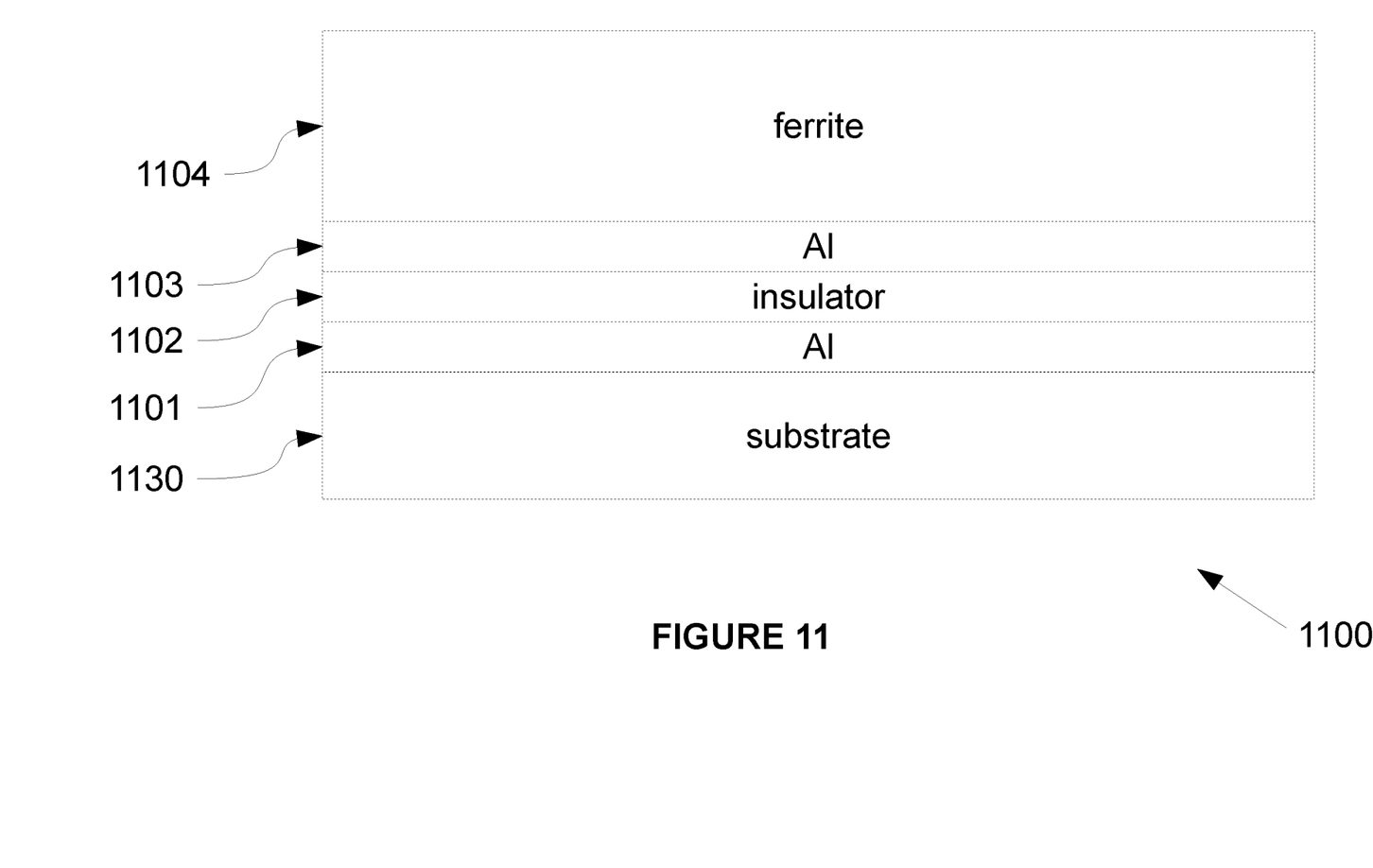
FIG. 11 is an elevation view of a layered construction of an antenna or inductor constructed in accordance with an embodiment of the invention.

Turning to FIG. 11, a simplified layer structure that can be used in an A4WP receiver will now be described in detail. Lower conducting layer 1101 is deposited onto non-conducting or minimally conducting substrate 1130. Insulator layer 1102 is deposited onto lower conducting layer 1101. Upper conducting layer 1103 is deposited onto insulator layer 1102. Ferrite layer 1104 is deposited onto upper conducting layer 1103. The introduction of ferrite layer 1104 into the layer stack allows the fabrication of inductors with higher inductance than would be possible without the presence of a ferromagnetic material such as ferrite. Furthermore, the introduction of ferrite into the layer structure allows the magnetic steering of wirelessly transmitted power through an antenna.

Figure 12:
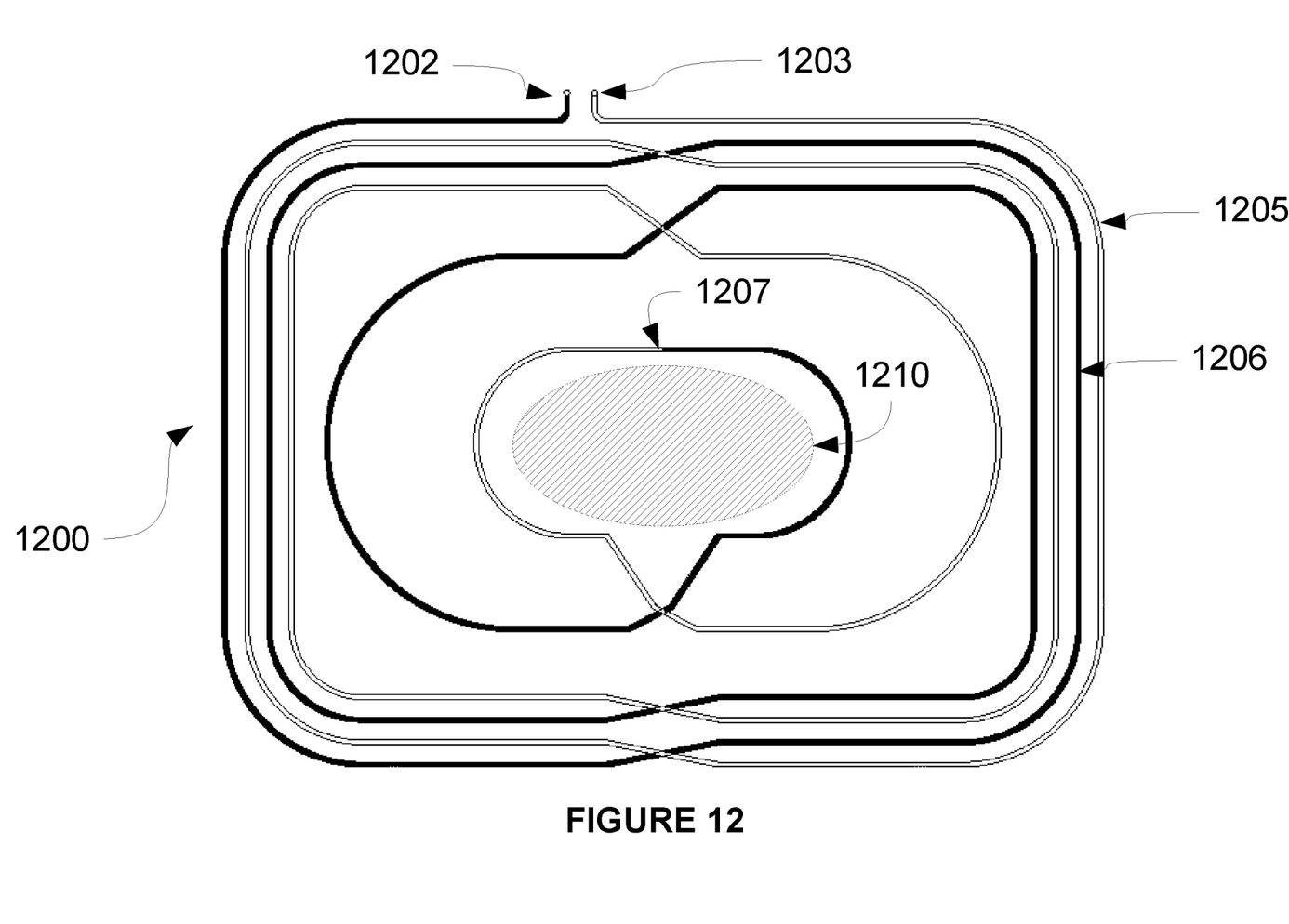
FIG. 12 is a top view of a printed circuit of a wireless antenna constructed in accordance with an embodiment of the invention.

Turning now to FIG. 12, an embodiment of an A4WP receiver antenna 1200 will now be described in detail. Antenna 1200 is similar to Antenna 500 of FIG. 5 except for the addition of a ferrite structure 1210 in the center of the antenna, and in which upper trace 1205, lower trace 1206, tie-point 1207, and terminals 1202 and 1203 in FIG. 12 correspond to upper trace 505, lower trace 506, tie-point 507, and terminals 502 and 503 in FIG. 5. The addition of ferrite structure 1210 in the center of the antenna 1200 helps to concentrate a magnetic field or fields into the antenna 1200 and may increase the antenna's effectiveness. As was mentioned regarding the number of turns in the antenna of FIG. 5 applies as well to the antenna of FIG. 12.

Figure 13:
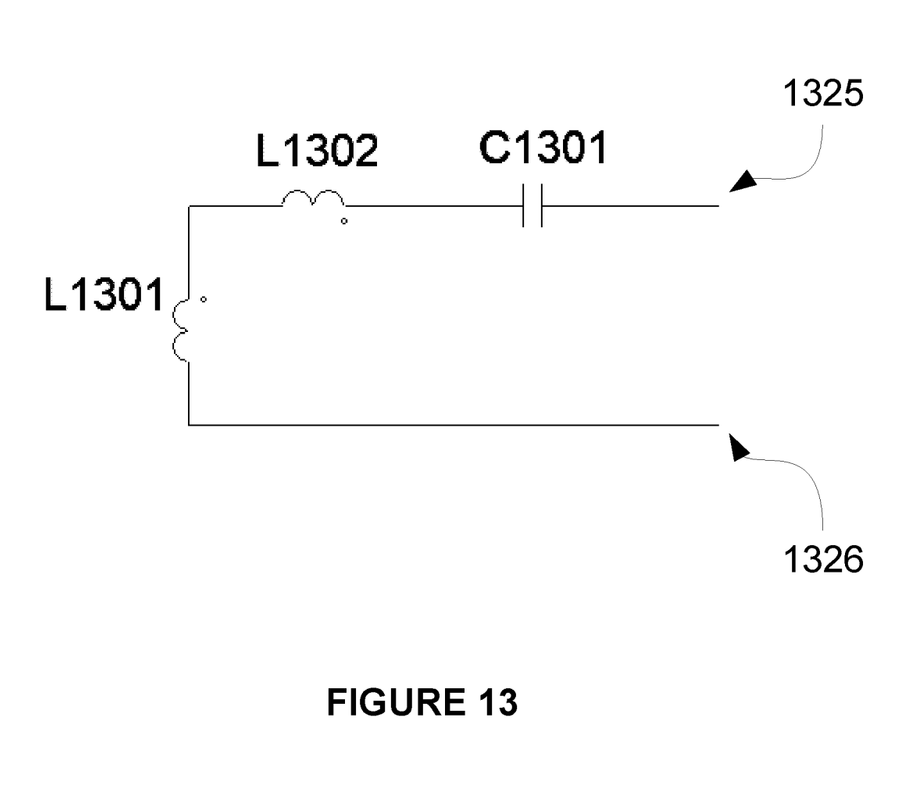
FIG. 13 is a schematic of a resonant antenna circuit constructed in accordance with an embodiment of the invention.

The structure illustrated in FIG. 12 can be used as an inductor rather than as an antenna. Turning to FIG. 13, a resonant system that utilizes an inductor L1302 with a ferrite layer to reduce the required size of the resonant capacitor will now be described in detail. Antenna L1301 is an A4WP receiving antenna with or without the presence of a ferrite layer. Capacitor C1301 is a resonant capacitor. The presence of inductor L1302 with a ferrite layer reduces the required capacitance of C1301. Since the surface area required by C1301 is proportional to its capacitance value, the presence of an inductor L1302 that utilizes ferrite in its structure may have a significant impact on overall device size. So, for example, if inductor L1302 had 10 times the inductance of antenna L1301, the total of inductance of antenna L1301 and inductor L1302 would increase a factor of 11 compared with the inductance of L1301 alone. The required value of capacitor C1301 to achieve a specific resonant frequency (such as 6.78 MHz) would then decrease by a factor of 11, and the required area of capacitor C1301 would also decrease by a factor of 11.

It should be noted that all of the benefits of incorporating a layer of ferrite in the overall device structure can also be achieved by using a ferrite substrate. The use of a ferrite substrate may have further advantages of simplifying the deposition process and allowing the use of a relatively thick layer of ferrite.

Thus, an apparatus, system and method has been introduced herein. In one embodiment, a power apparatus includes a wireless power receiver (100 in FIGS. 1, 2, 4) and a photovoltaic panel (120 in FIGS. 1, 3, 4) comprising a first p-n junction (D311 in FIGS. 3, 4). The wireless power receiver and the first p-n junction are fabricated via a common process onto a non-conducting (such as paper of plastic) or minimally conducting (such as ferrite) substrate (630 in FIG. 6, 730 in FIG. 7, 930 in FIG. 9).

The power apparatus may include a wireless power receiver (100 in FIGS. 1, 2, 4) comprising an antenna (L201 in FIGS. 2 and 4, 500 in FIG. 5, 810 in FIG. 8, 1010 in FIG. 10), a capacitor (C201 in FIGS. 2 and 4, 820 in FIG. 8), and a rectifier diode (D201 in FIGS. 2 and 4, 830 in FIG. 8, 1030 in FIG. 10) comprising a second p-n junction. In the power apparatus, the first p-n junction and the second p-n junction may comprise a layer of p-doped material (702 in FIG. 7, (922 in FIG. 9) deposited via a common process.

Other effective alternatives will occur to a person skilled in the art. For example, the conductive layers described in the construction of thin-film diodes and capacitors may comprise aluminum and/or may comprise other conductive materials such as silicon, doped silicon, carbon, or any conductive metal. Furthermore, other layers could be added to the structures of the capacitor, receiver antenna, diodes, or p-n junctions. Those skilled in the art should understand that the previously described embodiments of the thin-film photovoltaic wireless interface and related methods of operating the same are submitted for illustrative purposes only.

Also, although the present invention and its advantages have been described in detail, it should be understood that various changes, substitutions and alterations can be made herein without departing from the spirit and scope of the invention as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed:

1. A power apparatus comprising:
a low conductivity substrate;
a photovoltaic panel supported on the substrate and comprising a first p-n junction; and
a wireless power receiver supported on the substrate and including a second p-n junction;
the wireless power receiver and the photovoltaic panel being formed via a single iteration of a process selected from the group consisting of offset printing, screen printing, and inkjet printing.

2. The power apparatus of claim 1, wherein the wireless power receiver comprises an antenna, a capacitor, and a rectifier diode.

3. The power apparatus of claim 2, wherein the first p-n junction and the second p-n junction comprise a layer of p-doped material deposited via the process.

4. The power apparatus of claim 2, wherein the antenna comprises a trace of a first conducting layer, a trace of a second conducting layer, and a first layer of insulating material such that the first layer of insulating material separates the first conducting layer from the second conducting layer.

5. The power apparatus of claim 4, wherein the capacitor comprises two conducting plates such that the first conducting layer or the second conducting layer comprises one of the conducting plates of the capacitor.

6. The power apparatus of claim 2, wherein the photovoltaic panel is fabricated above layers of material that comprise the capacitor.

7. The power apparatus of claim 2, wherein the antenna comprises a deposited layer of ferrite.

8. The power apparatus of claim 2, wherein the wireless power receiver further comprises an inductor that includes a layer of ferrite.

9. The power apparatus of claim 1, wherein the substrate comprises a flexible non-conducting material including paper or flexible plastic.

10. The power apparatus of claim 1, wherein the first process comprises printing of p-doped material, n-doped material, conductive material, and a layer of insulation.

11. The power apparatus of claim 1, wherein the substrate comprises a low-conductivity ferromagnetic material.

12. The power apparatus of claim 11, wherein the low-conductivity ferromagnetic material comprises ferrite.

13. A power apparatus comprising:
a low conductivity substrate;
a photovoltaic panel supported on the substrate and including a first p-n junction; and
a wireless power receiver supported on the substrate and including an antenna, a capacitor, a discrete inductor, and a rectifier diode comprising a second p-n junction, said discrete inductor including a layer of ferrite and being configured to have an inductance at least ten times as high as an inductance of the antenna,
the photovoltaic panel and the wireless power receiver being formed via a single iteration of a process selected from the group consisting of offset printing, screen printing, and inkjet printing.

14. The power apparatus of claim 13, wherein the photovoltaic panel is fabricated above layers of material that comprise the capacitor.

15. The power apparatus of claim 13, wherein the antenna comprises a deposited layer of ferrite.

16. A power apparatus comprising:
a low conductivity substrate;
a photovoltaic panel supported on the substrate and including a plurality of p-n junctions; and
a wireless power receiver supported on the substrate, the wireless power receiver including:
an A4WP antenna formed of an upper conductive layer, a lower conductive layer, an insulator between the upper conductive layer and the lower conductive layer,
a capacitor formed of the upper conductive layer and the lower conductive layer,
a discrete inductor including a layer of ferrite and being configured to have an inductance at least ten times as high as an inductance of the antenna, and
a rectifier diode including a p-n junction;
the photovoltaic panel and the wireless power receiver being formed via a single iteration of a process selected from the group consisting of offset printing, screen printing, and inkjet printing.

\* \* \* \* \*